(12) United States Patent
Wu et al.

(10) Patent No.: US 12,492,109 B1
(45) Date of Patent: Dec. 9, 2025

(54) METHOD FOR DETERMINING STACKING STATE, CONTROLLER, AND MATERIAL HANDLING EQUIPMENT

(71) Applicant: VisionNav Robotics USA Inc., Acworth, GA (US)

(72) Inventors: Tingwei Wu, Acworth, GA (US); Bingchuan Yang, Acworth, GA (US); Yongxian Zeng, Acworth, GA (US)

(73) Assignee: VisionNav Robotics USA, Inc., Acworth, GA (US)

( * ) Notice: Subject to any disclaimer, the term of this patent is extended or adjusted under 35 U.S.C. 154(b) by 0 days.

(21) Appl. No.: 19/095,464

(22) Filed: Mar. 31, 2025

(30) Foreign Application Priority Data

Jan. 27, 2025 (CN) .......................... 202510126717.9

(51) Int. Cl.
| | |
|---|---|
| *B66F 9/075* | (2006.01) |
| *B66F 9/06* | (2006.01) |
| *G01S 17/89* | (2020.01) |
| *G05D 1/86* | (2024.01) |
| *G05D 105/20* | (2024.01) |
| *G05D 107/70* | (2024.01) |
| *G05D 109/10* | (2024.01) |
| *G05D 111/10* | (2024.01) |

(52) U.S. Cl.
CPC ............ *B66F 9/0755* (2013.01); *B66F 9/063* (2013.01); *G01S 17/89* (2013.01); *G05D 1/86* (2024.01); *G05D 2105/20* (2024.01); *G05D 2107/70* (2024.01); *G05D 2109/10* (2024.01); *G05D 2111/17* (2024.01)

(58) Field of Classification Search
CPC ........ B66F 9/0755; B66F 9/063; G01S 17/89; G05D 1/86; G05D 2105/20; G05D 2107/70; G05D 2109/10; G05D 2111/17
See application file for complete search history.

(56) References Cited

U.S. PATENT DOCUMENTS

2018/0089616 A1   3/2018 Jacobus et al.
2018/0327192 A1*  11/2018 Hamaguchi ............ B65G 43/00
(Continued)

FOREIGN PATENT DOCUMENTS

| CN | 114882112 A | 8/2022 |
| CN | 115123839 B | 12/2022 |

(Continued)

*Primary Examiner* — Michael J Zanelli
(74) *Attorney, Agent, or Firm* — Westbridge IP LLC

(57) ABSTRACT

Disclosed are a method for determining a stacking state, a controller, and material handling equipment. The technical solution includes: acquiring target data of a first stacking object and a second stacking object; extracting, from the target data, first target data of the first stacking object and second target data of the second stacking object; extracting a first boundary of the first stacking object based on the first target data, and extracting a second boundary of the second stacking object based on the second target data; and calculating a width of a first gap between the first stacking object and the second stacking object based on the first boundary and the second boundary, and comparing the width of the first gap with a first threshold to determine a first stacking state. The present disclosure may help improve efficiency and accuracy of a determining process of a stacking state.

24 Claims, 11 Drawing Sheets

(56) References Cited

U.S. PATENT DOCUMENTS

| | | | | |
|---|---|---|---|---|
| 2021/0141368 A1* | 5/2021 | Holwell | ........... | G05B 19/41895 |
| 2022/0089419 A1* | 3/2022 | Kim | ....................... | G05D 1/247 |
| 2022/0396431 A1* | 12/2022 | Chen | ...................... | B65G 43/08 |

FOREIGN PATENT DOCUMENTS

| | | | | |
|---|---|---|---|---|
| CN | 115924452 A | | 4/2023 | |
| CN | 116177081 A | | 5/2023 | |
| CN | 117788940 A | | 3/2024 | |
| WO | WO-2014053703 A1 * | | 4/2014 | ............. B66C 13/00 |

* cited by examiner

METHOD FOR DETERMINING STACKING STATE, CONTROLLER, AND MATERIAL HANDLING EQUIPMENT

CROSS-REFERENCE TO RELATED APPLICATIONS

This application claims priority to Chinese Patent Application No. 202510126717.9, filed on Jan. 27, 2025, which is hereby incorporated by reference in its entirety.

TECHNICAL FIELD

The present disclosure relates to the field of warehouse logistics technologies or machine vision, and in particular, to a method for determining a stacking state, a controller, and material handling equipment.

BACKGROUND

A system that uses material handling equipment such as an automated guided vehicle (AGV) during operation has advantages such as being highly unmanned, automated, and intelligent, which improves production efficiency and operational levels in industries such as warehousing, manufacturing, and logistics. In a typical scenario, material handling equipment is often responsible for moving various goods, during which stacking of goods is inevitably involved. The goods are usually packed by using cardboard boxes or the like, or stored by using a material cage, a wooden box, a plastic box, or the like.

In consideration of space utilization, stacking objects such as cardboard boxes, material cages, and wooden boxes that are loaded with goods may be stacked in a process of moving the goods by the material handling equipment. In view of stability, the material handling equipment is required to accurately stack one stacking object onto another stacking object. In a conventional implementation, whether stacking is successful cannot be accurately determined.

SUMMARY

The present disclosure provides a method for determining a stacking state, a controller, and material handling equipment, to improve efficiency and reliability of a determining process of a stacking state.

According to a first aspect, a method for determining a stacking state is provided by embodiments of the present disclosure, including: acquiring target data of a first stacking object and a second stacking object by using a first sensor; extracting, from the target data, first target data of the first stacking object and second target data of the second stacking object; extracting a first boundary of the first stacking object based on the first target data, and extracting a second boundary of the second stacking object based on the second target data; and calculating a width of a first gap between the first stacking object and the second stacking object based on the first boundary and the second boundary, and comparing the width of the first gap with a first threshold to determine a first stacking state of the first stacking object relative to the second stacking object.

According to a second aspect, a controller is provided. The controller is configured to execute program instructions to implement the steps of the method in any implementation of the first aspect.

According to a third aspect, material handling equipment is provided, including a controller. The controller is configured to execute program instructions to implement the steps of the method in any implementation of the first aspect.

BRIEF DESCRIPTION OF THE DRAWINGS

To describe the technical solutions in the embodiments of the present disclosure or in the conventional technology more clearly, the following briefly describes the accompanying drawings required for describing the embodiments. Apparently, the accompanying drawings in the following description only show some embodiments of the present disclosure, and those skilled in the art may still derive other drawings from these accompanying drawings without creative efforts.

DETAILED DESCRIPTION OF THE EMBODIMENTS

The following clearly and completely describes the technical solutions in embodiments of the present disclosure with reference to the accompanying drawings in embodiments of the present disclosure. Apparently, the described embodiments are merely some but not all of embodiments of the present disclosure. All other embodiments obtained by those skilled in the art based on the embodiments of the present disclosure shall fall within the protection scope of the present disclosure.

Terms used in embodiments of the present disclosure are merely intended to describe particular embodiments but are not intended to limit the present disclosure. The singular forms of "a/an", "said", and "the" used in embodiments of the present disclosure and the appended claims are also intended to include plural forms, unless the context clearly implies otherwise.

It should be understood that, the term "and/or" used in this specification is merely an association relationship that describes associated objects, and represents that there may be three relationships. For example, A and/or B may represent three cases: only A exists, both A and B exist, and only B exists. In addition, the character "/" in this specification generally indicates an "or" relationship between the associated objects. In addition, the term "based on" used in this specification is not limited to being based on an object only. For example, determining B based on A may indicate: determining B based on A only, or determining B partially based on A.

In an existing warehousing scenario, when material handling equipment stacks one stacking object onto another stacking object, due to an external environment (such as an uneven ground) and an error of the material handling equipment, the stacking may fail. Therefore, it is necessary to determine whether stacking of two stacking objects is successful.

In view of this, the present disclosure provides a new idea, and proposes a method for determining a stacking state, a controller, and material handling equipment.

Figure 1:
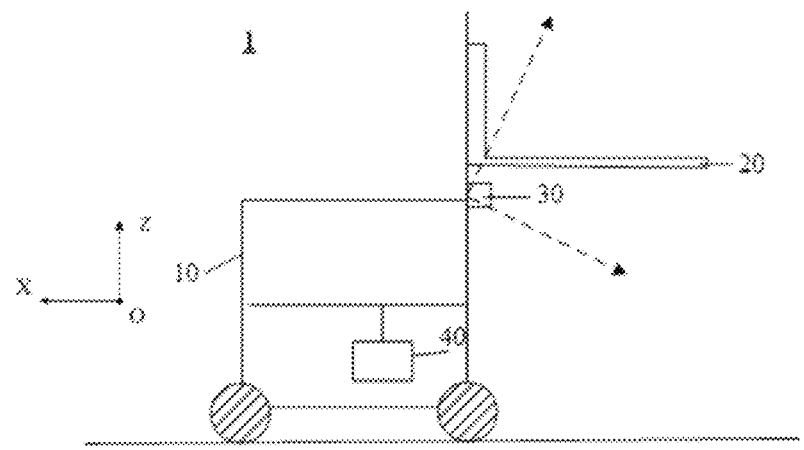
FIG. 1 is a schematic structural diagram of material handling equipment according to an embodiment of the present disclosure.

The method provided in embodiments of the present disclosure may be applied to material handling equipment shown in FIG. 1. FIG. 1 is a schematic structural diagram of material handling equipment according to an embodiment of the present disclosure. As shown in FIG. 1, the material handling equipment 1 includes material handling equipment body 10, a sensor 30, a stacking execution component 20, a controller 40. Exemplarily, the controller 40 may include a memory and a processor. The memory is configured to store program instructions, and the controller is configured to execute the program instructions to implement the method provided by the embodiments of the present disclosure.

The material handling equipment 1 in embodiments of the present disclosure may be an automated guided forklift, a pallet truck, a crane truck, an Automated Guided Vehicle (AGV), an Autonomous Mobile Robot (AMR), a humanoid robot, or the like. A corresponding stacking execution component 20 may be a fork, a robotic arm, or the like.

Generally, the material handling equipment 1 receives a handling task from a Robot Control System (RCS), and after receiving the handling task, the material handling equipment 1 may be controlled by the controller 40 to perform the handling task. For example, the material handling equipment 1 is controlled to stack a first stacking object A onto a second stacking object B.

The RCS may be integrated into the material handling equipment 1, and forms a whole with the material handling equipment 1, or may be separately used as a device different from the material handling equipment 1. For example, the RCS may be a device such as a tablet computer, a notebook computer, a Personal Computer (PC), a local server, or a cloud server. This is not limited in embodiments of the present disclosure.

The sensor 30 may be in a form of a sensor module, and may include radar for collecting point cloud data, for example, Lidar. The Lidar may be installed on the stacking execution component 20, to facilitate collection of point cloud data. Further, the Lidar may be a three-dimensional Lidar. The sensor 30 may also include a camera for collecting image data. The camera may be installed on the stacking execution component 20, to facilitate collection of image data. The sensor 30 may also include a pressure sensor for collecting pressure data, and the pressure sensor may be installed on the stacking execution component 20.

The memory in the controller 40 may be further configured to store data collected by the sensor 30, such as point cloud data, image data, or pressure data.

The following describes the main terms in the present disclosure.

A processor is configured to be responsible for executing core functions such as computation, control, and decision-making. It may receive data from a sensor, run control algorithms, and command an actuator to complete a task. Common processor types may include a central processing unit (CPU), a digital signal processor (DSP), a microcontroller unit (MCU), and so on. A processor in this specification refers to a collection of processors for performing the same or different tasks.

A memory is configured to store data or a program. The memory in this specification refers to a collection of memory used for performing the same or different tasks.

A controller typically includes a processor and memory at a hardware level. Optionally, the controller may also include input/output interfaces, a mainboard, peripheral circuits, and components. At a software level, the controller usually includes a control algorithm, an operating system, communication protocols, and so on. The controller in this specification refers to a set of controllers for performing the same or different tasks.

Material handling equipment refers to equipment that is capable of automatically or semi-automatically performing handling a handling task. Common forms of the material handling equipment include a forklift, an Automated Guided Vehicle (AGV), an Autonomous Mobile Robots (AMR), a humanoid robot, a robotic arm, and the like.

An Automated Guided Forklift (AGF) refers to an intelligent industrial vehicle that integrates forklift technology and Automated Guided Vehicle (AGV) technology. It can automatically complete tasks such as material handling and stacking.

Stacking refers to arranging and piling up some objects vertically according to a specific rule.

A stacking object refers to an object involved in stacking, and specifically may be goods itself or goods with a simple package such as a wrapping film, or may be a container that can hold and carry goods, for example, a material cage, a wooden box, a plastic box, or a pallet.

A stacking process refers to a process in which material handling equipment lifts a first stacking object to make the first stacking object move close to a second stacking object, and then adjusts a pose of the material handling equipment to align the first stacking object with the second stacking object, and thus places the first stacking object on the second stacking object, so as to complete stacking.

The first stacking object refers to a stacking object located above another. The second stacking object refers to a stacking object located below.

A stacking state refers to a relative position state of two stacking object in a stacking process.

Alignment means a state in which two or more stacking objects are arranged in a vertical direction, and at least part of border lines of a stacking object are parallel to or overlapped with another stacking object. The vertical direction refers to a Z-axis direction (namely, a height direction of the material handling equipment) in a coordinate system of material handling equipment.

In embodiments of the present disclosure, still referring to FIG. 1, in the coordinate system, a geometric center of the material handling equipment 1 may be used as an origin O. A forward-backward travel direction (namely, a first direction of the material handling equipment body 10) of the material handling equipment 1 may be used as an X-axis, where a positive direction of the X-axis is a direction away from an attachment (for example, a fork) of the material handling equipment 1. A lateral direction (namely, a second direction of the material handling equipment body 10) of the material handling equipment 1 may be used as a Y-axis, where a positive direction of the Y-axis is perpendicular to the page, pointing outwards (not shown in the figure). A height direction of the material handling equipment 1 may be used as a Z-axis.

Each of a first target region and a third target region refers to a specific region that is on the first stacking object and that is used for detection and analysis, for example, a key structural region such as a boundary or an edge target point of the first stacking object.

Each of a second target region and a fourth target region refers to a specific region that is on the second stacking object and that is used for detection and analysis, for example, a key structural region such as a boundary or an edge target point of the second stacking object.

Figure 2A:
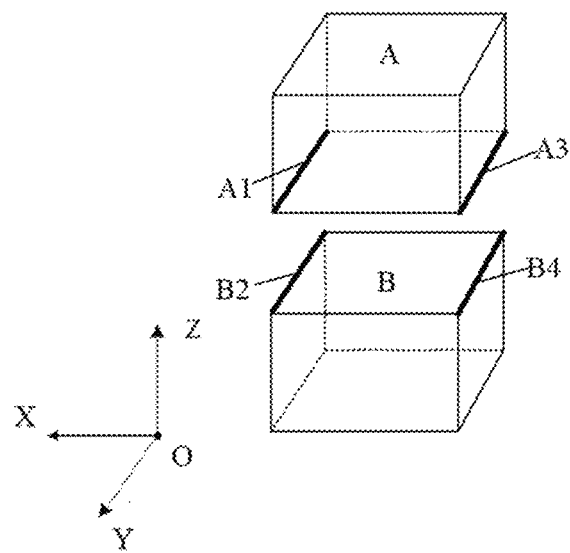
FIG. 2*a* is a schematic diagram of a first target region, a second target region, a third target region, and a fourth target region according to an embodiment of the present disclosure.
Figure 2B:
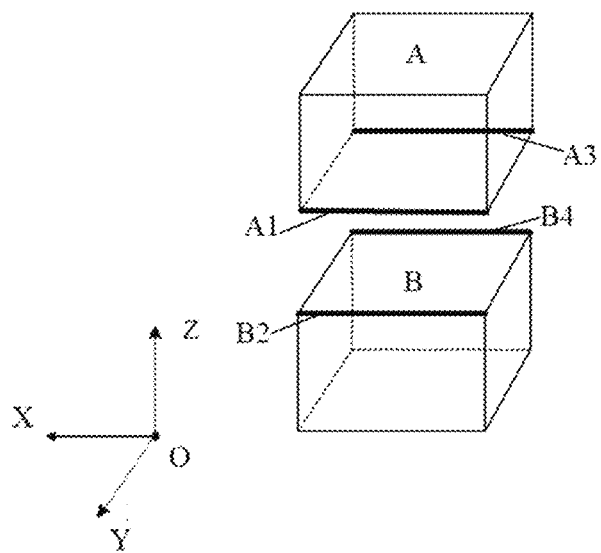
FIG. 2*b* is a schematic diagram of a first target region, a second target region, a third target region, and a fourth target region according to another embodiment of the present disclosure.

FIG. 2a is a schematic diagram of a first target region, a second target region, a third target region, and a fourth target region provided by an embodiment. FIG. 2b is a schematic diagram of a first target region, a second target region, a third target region, and a fourth target region provided by another embodiment. As shown in FIG. 2a and FIG. 2b, a stacking object A located above is a first stacking object, and a stacking object B located below is a second stacking object. A bottom structural region on one side of the first stacking object is a first target region A1, and a bottom structural region on the other side of the first stacking object is a third target region A3. A top structural region on one side of the second stacking object is a second target region B2, and a top structural region on the other side of the second stacking object is a fourth target region B4. The first target region A1 and the third target region A3 are respectively located on opposite sides of the first stacking object. The second target region B2 and the fourth target region B4 are respectively located on opposite sides of the second stacking object. In a stacking process, both the first target region A1 and the second target region B2 are on one side, and both the third target region A3 and the fourth target region B4 are on the other side. FIG. 2a and FIG. 2b respectively show two different target region configuration manners.

In addition, the first target region and the third target region may alternatively be located on two adjacent sides of the first stacking object, and the second target region and the fourth target region may alternatively be located on two adjacent sides of the second stacking object.

Target data refers to data acquired by a sensor, including point cloud data, image data, and the like.

First target data is data, acquired by a sensor, of the first target region of the first stacking object, and includes point cloud data and image data. The first target data may be used for calculating a pose, a stacking state, and the like of the first stacking object.

Third target data is data, acquired by a sensor, of the third target region of the first stacking object, and includes point cloud data and image data. The third target data may be used for calculating a pose, a stacking state, and the like of the first stacking object.

Second target data is data, acquired by a sensor, of the second target region of the second stacking object, and includes point cloud data and image data. The second target data may be used for calculating a pose, a stacking state, and the like of the second stacking object.

Fourth target data is data, acquired by a sensor, of the fourth target region of the second stacking object, and includes point cloud data and image data. The fourth target data may be used for calculating a pose, a stacking state, and the like of the second stacking object.

First stacking state refers to a relative position state of the first target region of the first stacking object and the second target region of the second stacking object in a stacking process.

Second stacking state refers to a relative position state of the third target region of the first stacking object and the fourth target region of the second stacking object in a stacking process.

Third stacking state refers to a relative position state, determined based on a first sensor, of the first stacking object and the second stacking object in a stacking process.

Fourth stacking state refers to a relative position state, determined based on a second sensor, of the first stacking object and the second stacking object in a stacking process.

The first sensor may include but is not limited to a three-dimensional Lidar, a depth camera, or the like.

The second sensor may include but is not limited to a pressure switch.

Figure 3:
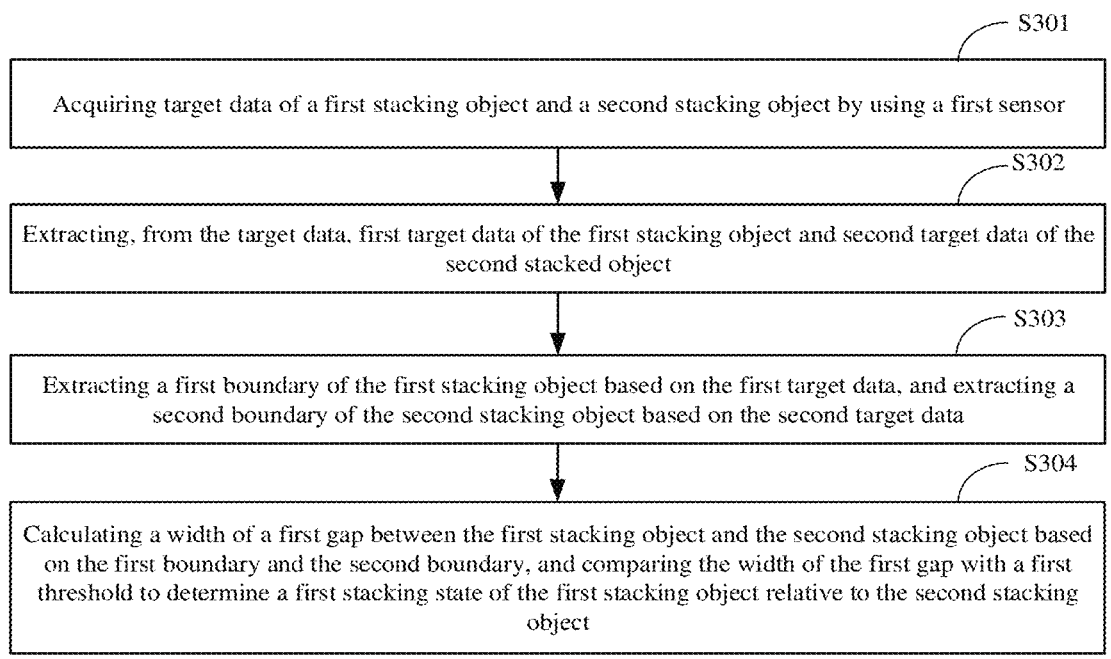
FIG. 3 is a flowchart of a method for determining a stacking state according to an embodiment of the present disclosure.

FIG. 3 is a flowchart of a method for determining a stacking state according to an embodiment of the present disclosure. As shown in FIG. 3, the method may include the following steps.

Step S301: acquiring target data of a first stacking object and a second stacking object by using a first sensor.

Step S302: extracting, from the target data, first target data of the first stacking object and second target data of the second stacking object.

Step S303: extracting a first boundary of the first stacking object based on the first target data, and extracting a second boundary of the second stacking object based on the second target data.

Step S304: calculating a width of a first gap between the first stacking object and the second stacking object based on the first boundary and the second boundary, and comparing the width of the first gap with a first threshold to determine a first stacking state of the first stacking object relative to the second stacking object.

It may be learned from the foregoing procedure that, in the present disclosure, the first stacking state of the first stacking object relative to the second stacking object is determined based on a width of a gap between the first stacking object and the second stacking object. Implementation of this solution is not affected by light and has strong adaptability to an environment and low dependence on data without requiring a large amount of labeled data, so that efficiency and accuracy of a stacking determining process may be improved.

The following describes in detail steps in the foregoing procedure and effects that can be further generated with reference to the embodiment. Terms such as "first" and "second" in this disclosure do not have limitations on a size, a sequence, a quantity, or the like, but are merely used to distinguish between names, for example, "first stacking object" and "second stacking object" are used to distinguish between two stacking objects, "first target region", "second target region", "third target region" and "fourth target region" are used to distinguish between four target regions, "first target data", "second target data", "third target data" and "fourth target data" are used to distinguish between four target data, and "first gap" and "second gap" are used to distinguish between two gaps.

The "acquiring target data of the first stacking object and the second stacking object by using the first sensor" in Step S301 is described in detail with reference to embodiments.

The first sensor in the embodiment of the present disclosure may include but is not limited to Lidar, such as a 3D Lidar and a depth camera.

Specifically, when the controller controls a fork of material handling equipment to stack the first stacking object stacking onto the second stacking object, Lidar of the material handling equipment is configured to scan the first stacking object and the second stacking object to obtain the target data of the first stacking object and the target data of the second stacking object. Then, the Lidar stores collected target data in the memory in the controller, and the controller acquires the target data from the memory. Alternatively, the Lidar may directly send collected target data to the controller.

The target data herein may be point cloud data, and the point cloud data includes 3D geometric information of the first stacking object and the second stacking object.

In addition, in an actual application process, after the controller aligns the first stacking object and the second stacking object vertically by controlling a pose of the material handling equipment, it is necessary to first lower the fork of the material handling equipment to a fork-out height, allowing the first stacking object to be stacked onto the second stacking object. In this case, the Lidar is configured to scan the first stacking object and the second stacking object to obtain the target data, so that the stacking state may be determined based on the target data.

The "extracting, from the target data, the first target data of the first stacking object and the second target data of the second stacking object" in Step S302 is described below in detail with reference to the embodiment.

After acquiring the target data, the controller is required to extract the first target data of the first stacking object and the second target data of the second stacking object from the target data.

Optionally, the first target data may be data of a first target region of the first stacking object, the second target data may be data of a second target region of the second stacking object, and the first target region and the second target region are respectively located on a same side of the first stacking object and the second stacking object.

In the embodiment of the present disclosure, the first target region at least includes a bottom edge on a side of the first stacking object, and the second target region at least includes a top edge on a side of the second stacking object.

In a stacking process, along the X-axis, it may be observed that, in an implementation, as shown in FIG. 2a, the first target region includes a bottom edge on a left (or right) side of the first stacking object, and the second target region includes a top edge on a left (or right) side of the second stacking object. In another implementation, as shown in FIG. 2b, the first target region includes a bottom edge on a front (or rear) side of the first stacking object, and the second target region includes a top edge on a front (or rear) side of the second stacking object.

The first target region and the second target region herein are only required to be located on a same side of the first stacking object and the second stacking object respectively and at least include a bottom edge of the first stacking object and a top edge of the second stacking object respectively, and specific positions thereof are not limited in the embodiment of the present disclosure.

Specifically, the controller may obtain pre-stored specifications (such as size and shape) of the first stacking object and the second stacking object from the memory, and then determine the first target data of the first target region and the second target data of the second target region from the target data according to the specifications.

Optionally, after the target data is obtained, preprocessing such as filtering, outlier removal, data cleaning, and data transformation may be performed on the target data. The preprocessing may be performed to remove a noise point from the target data, and reserve valid data for future use. In this way, accuracy and reliability of the target data may be further improved.

The "extracting the first boundary of the first stacking object based on the first target data, and extracting the second boundary of the second stacking object based on the second target data" in Step S303 is described below in detail with reference to the embodiment.

Figure 14:
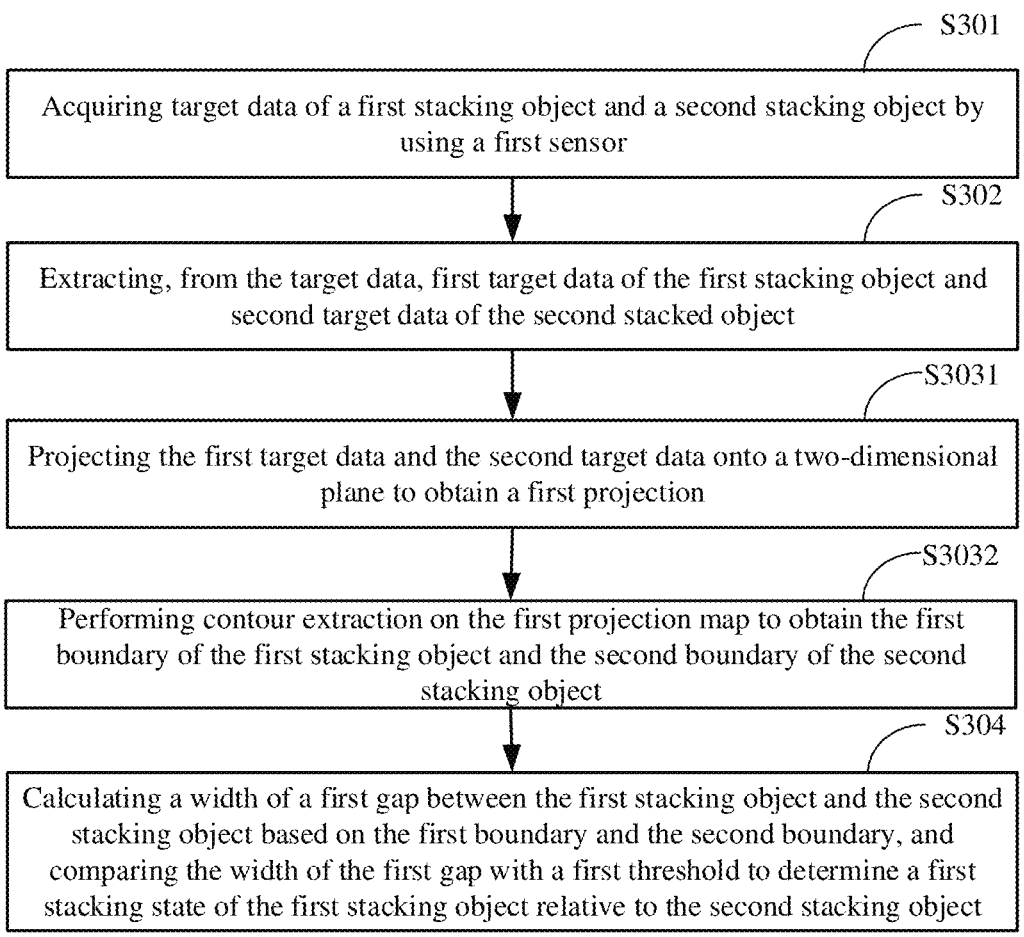
FIG. 14 is a flowchart of yet still another method for determining a stacking state according to an embodiment of the present disclosure.

In an implementation, as shown in FIG. 14, in the embodiment of the present disclosure, step S303 may include the following steps.

Step S3031: projecting the first target data and the second target data onto a two-dimensional plane to obtain a first projection.

Step S3032: performing contour extraction on the first projection to obtain the first boundary of the first stacking object and the second boundary of the second stacking object.

The two-dimensional plane herein may include but is not limited to a plane for projecting and analyzing the target data in a coordinate system of the material handling equipment.

When the first target region includes a bottom edge on a left (or right) side of the first stacking object, and the second target region includes a top edge on a left (or right) side of the second stacking object, the two-dimensional plane is an XOZ-plane in a coordinate axis centered on the material handling equipment, where an X-axis represents a travel direction (namely, a first direction of the material handling equipment body 10) of the material handling equipment, a Y-axis represents a lateral direction (namely, a second direction of the material handling equipment body 10) of the material handling equipment, and a Z-axis represents a height direction of the material handling equipment, which are consistent with directions of the coordinate axes in FIG. 1, FIG. 2a, and FIG. 2b.

When the first target region includes a bottom edge on a front (or rear) side of the first stacking object, and the second target region includes a top edge on a front (or rear) side of the second stacking object, the two-dimensional plane is a YOZ plane in a coordinate axis centered on the material handling equipment.

A projection direction is not limited to a direction perpendicular to the XOZ-plane or the YOZ-plane, and any projection direction perpendicular to the Z-axis may be used as the projection direction in the embodiment.

The "calculating the width of the first gap between the first stacking object and the second stacking object based on the first boundary and the second boundary, and comparing the width of the first gap with the first threshold to determine the first stacking state of the first stacking object relative to the second stacking object" in Step S304 is described below in detail with reference to the embodiment.

In the embodiment of the present disclosure, the first stacking state includes a first safe state and a first unsafe state, where the first safe state refers to that the width of the first gap is less than or equal to the first threshold.

A target region configuration manner in FIG. 2a is used as an example to describe the first stacking state.

Figure 4:
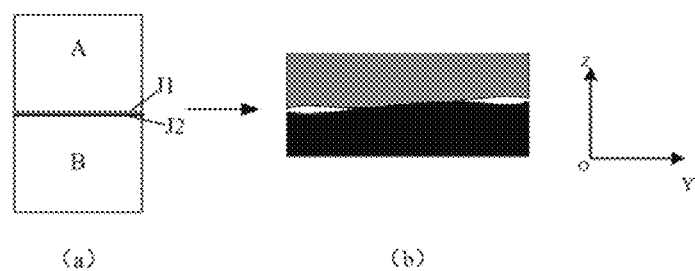
FIG. 4 is a schematic diagram of successful stacking according to an embodiment of the present disclosure.

As shown in FIG. 4, part (a) in FIG. 4 is a side view in a case that the first stacking state is stacking successful, in which a gap width, that is formed by stacking a first stacking object A onto a second stacking object B and calculated based on a first boundary corresponding to a first edge J1 of the first stacking object A and a second boundary corresponding to a second edge J2 of the second stacking object B, is less than the first threshold. Part (b) in FIG. 4 is a projection obtained by projecting the first edge J1 and the second edge J2 on a YOZ plane.

Figure 5:
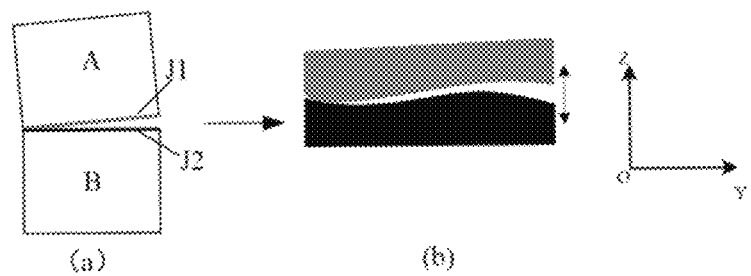
FIG. 5 is a schematic diagram of a stacking failure according to an embodiment of the present disclosure.

As shown in FIG. 5, part (a) in FIG. 5 is a side view in a case that the first stacking state is stacking failed, in which a gap width, that is formed by stacking a first stacking object A onto a second stacking object B and calculated based on a first boundary corresponding to a first edge J1 of the first stacking object A and a second boundary corresponding to a second edge J2 of the second stacking object B is greater than or equal the first threshold. Part (b) in FIG. 5 is a projection obtained by projecting the first edge J1 and the second edge J2 on a YOZ plane.

Specifically, when the width of the first gap between the first stacking object and the second stacking object is calculated based on the first boundary and the second boundary, if the width of the gap formed between the first boundary and the second boundary is uneven, the width of the first gap is determined based on a maximum width of a gap formed between the first boundary and the second boundary.

Figure 11:
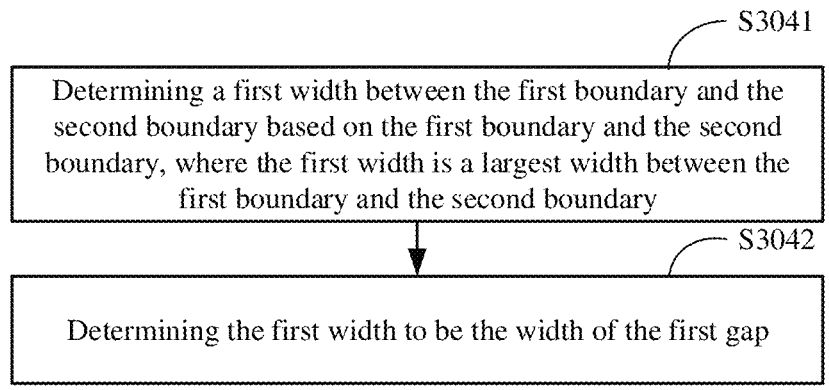
FIG. 11 is a flowchart of a method for calculating a width of a first gap between a first stacking object and a second stacking object according to an embodiment of the present disclosure.

Exemplarily, as shown in FIG. 11, Step S304, that is, the "calculating the width of the first gap between the first stacking object and the second stacking object based on the first boundary and the second boundary" may include the following steps.

Step S3041: determining a first width between the first boundary and the second boundary based on the first boundary and the second boundary, where the first width is a largest width between the first boundary and the second boundary.

Step S3042: determining the first width to be the width of the first gap.

The first threshold in embodiments of the present disclosure may be obtained through automatic learning based on historical data, or may be set according to an actual requirement, which is not limited in embodiments of the present disclosure.

In addition, before determining the first stacking state of the first stacking object relative to the second stacking object, the controller is required to control movement of the material handling equipment, so as to ensure that the first stacking object and the second stacking object are aligned in the XOY plane. In other words, projections of the first stacking object and the second stacking object on the XOY plane are aligned. In this way, a success rate in subsequent stacking may be improved, and damage or a safety accident caused by misalignment may be reduced. Such precise alignment is also a basis for subsequent measurement of the gap width and determining of a stacking state, ensuring efficiency and accuracy of an entire stacking process.

Figure 12:
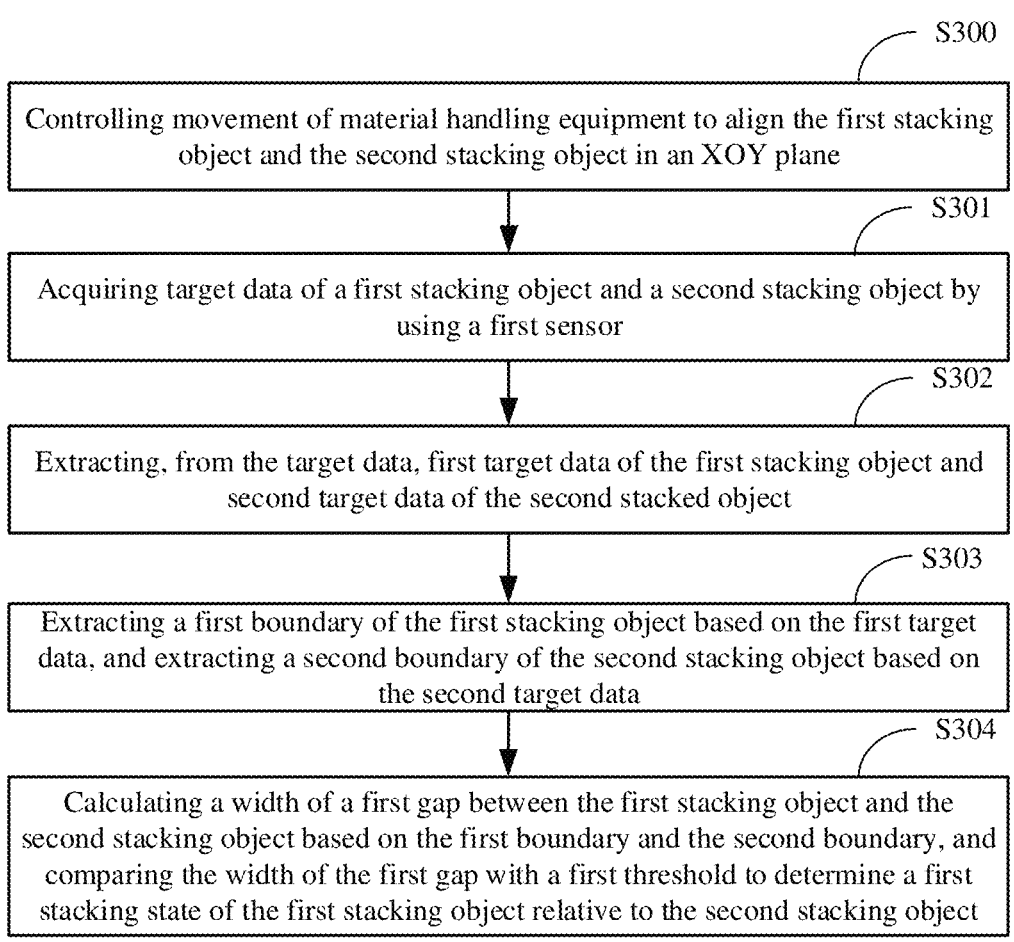
FIG. 12 is a flowchart of yet still another method for determining a stacking state according to an embodiment of the present disclosure.

Exemplarily, as shown in FIG. 12, the method for determining a stacking state according to an embodiment of the present disclosure may further include the following steps.

Step S300: controlling movement of material handling equipment to align the first stacking object and the second stacking object in an XOY plane. Exemplarily, the material handling equipment is controlled to move to align orthographic projections of the first stacking object and the second stacking object on a horizontal plane.

In the embodiment of the present disclosure, a first stacking state of a first stacking object relative to a second stacking object is determined based on a width of a gap formed on any side when the first stacking object is stacked onto the second stacking object, thereby improving efficiency and accuracy of a stacking determining process.

Figure 6:
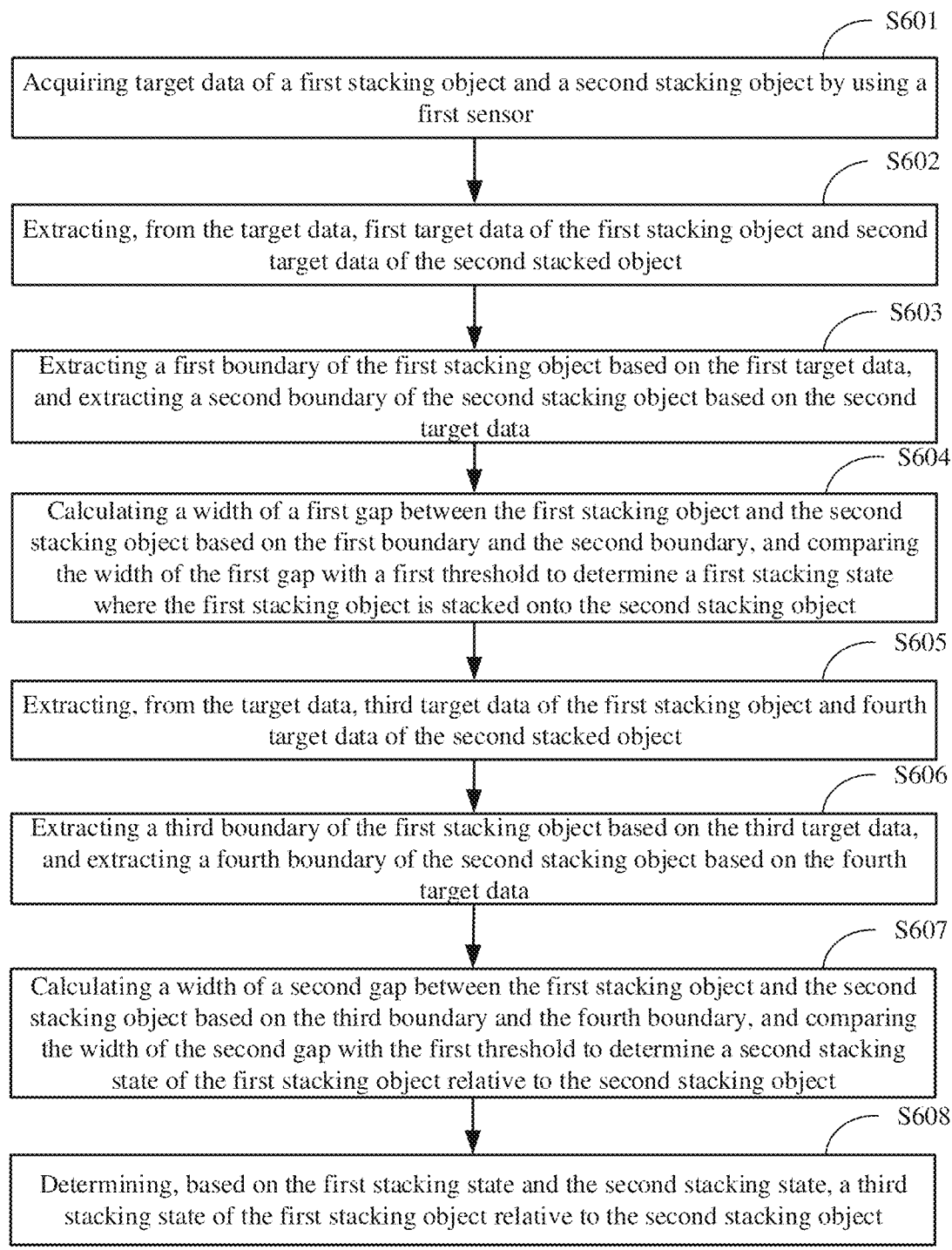
FIG. 6 is a flowchart of another method for determining a stacking state according to an embodiment of the present disclosure.

Based on a same idea, an embodiment of the present disclosure further provides a method for determining a stacking state. As shown in FIG. 6, the method includes the following steps.

Step S601: acquiring target data of a first stacking object and a second stacking object by using a first sensor.

Step S602: extracting, from the target data, first target data of the first stacking object and second target data of the second stacking object.

Step S603: extracting a first boundary of the first stacking object based on the first target data, and extracting a second boundary of the second stacking object based on the second target data.

Step S604: calculating a width of a first gap between the first stacking object and the second stacking object based on the first boundary and the second boundary, and comparing the width of the first gap with a first threshold to determine a first stacking state where the first stacking object is stacked onto the second stacking object.

Step S605: extracting, from the target data, third target data of the first stacking object and fourth target data of the second stacking object.

Step S606: extracting a third boundary of the first stacking object based on the third target data, and extracting a fourth boundary of the second stacking object based on the fourth target data.

Step S607: calculating a width of a second gap between the first stacking object and the second stacking object based on the third boundary and the fourth boundary, and comparing the width of the second gap with the first threshold to determine a second stacking state of the first stacking object relative to the second stacking object.

The second stacking state includes a second safe state and a second unsafe state, and the second safe state refers to that the width of the second gap is less than or equal to the first threshold.

Step S608: determining, based on the first stacking state and the second stacking state, a third stacking state of the first stacking object relative to the second stacking object.

Specifically, when the width of the second gap between the first stacking object and the second stacking object is calculated based on the third boundary and the fourth boundary, if the width of the gap formed between the third boundary and the fourth boundary is uneven, the width of the second gap is determined based on a maximum width of a gap formed between the third boundary and the fourth boundary.

Content of Step S601 to Step S604 is the same as that of Step S301 to Step S304, and details are not described herein again.

Step S605 to step S607 are merely different from Step S302 to Step S304 in that: in Step S302 to Step S304, the first stacking state is determined based on the first target data of the first target region and the second target data of the second target region; while in Step 605 to Step 607, the second stacking state is determined based on the third target data of the third target region and the fourth target data of the fourth target region. Specific implementation principles are the same, and thus details are not described herein again.

Figure 13:
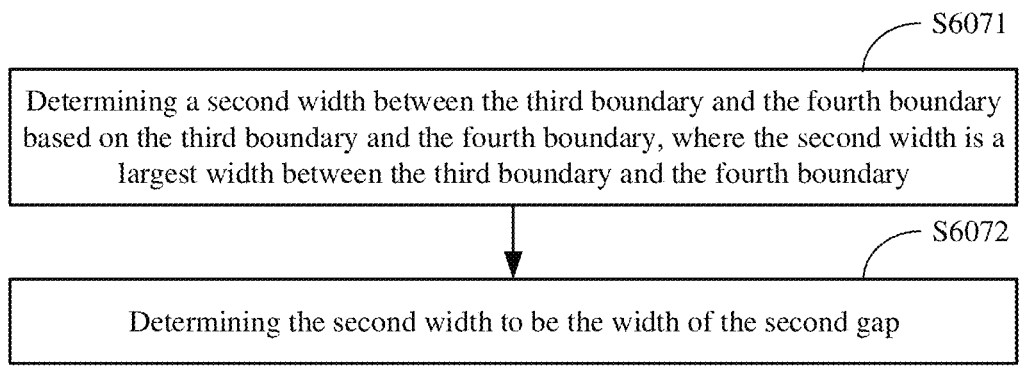
FIG. 13 is a flowchart of a method for calculating a width of a second gap between a first stacking object and a second stacking object according to an embodiment of the present disclosure.

Exemplarily, as shown in FIG. 13, Step S607, that is, the "calculating the width of the second gap between the first stacking object and the second stacking object based on the third boundary and the fourth boundary" may include the following steps.

Step S6071: determining a second width between the third boundary and the fourth boundary based on the third boundary and the fourth boundary, where the second width is a largest width between the third boundary and the fourth boundary.

Step S6072: determining the second width to be the width of the second gap.

Figure 15:
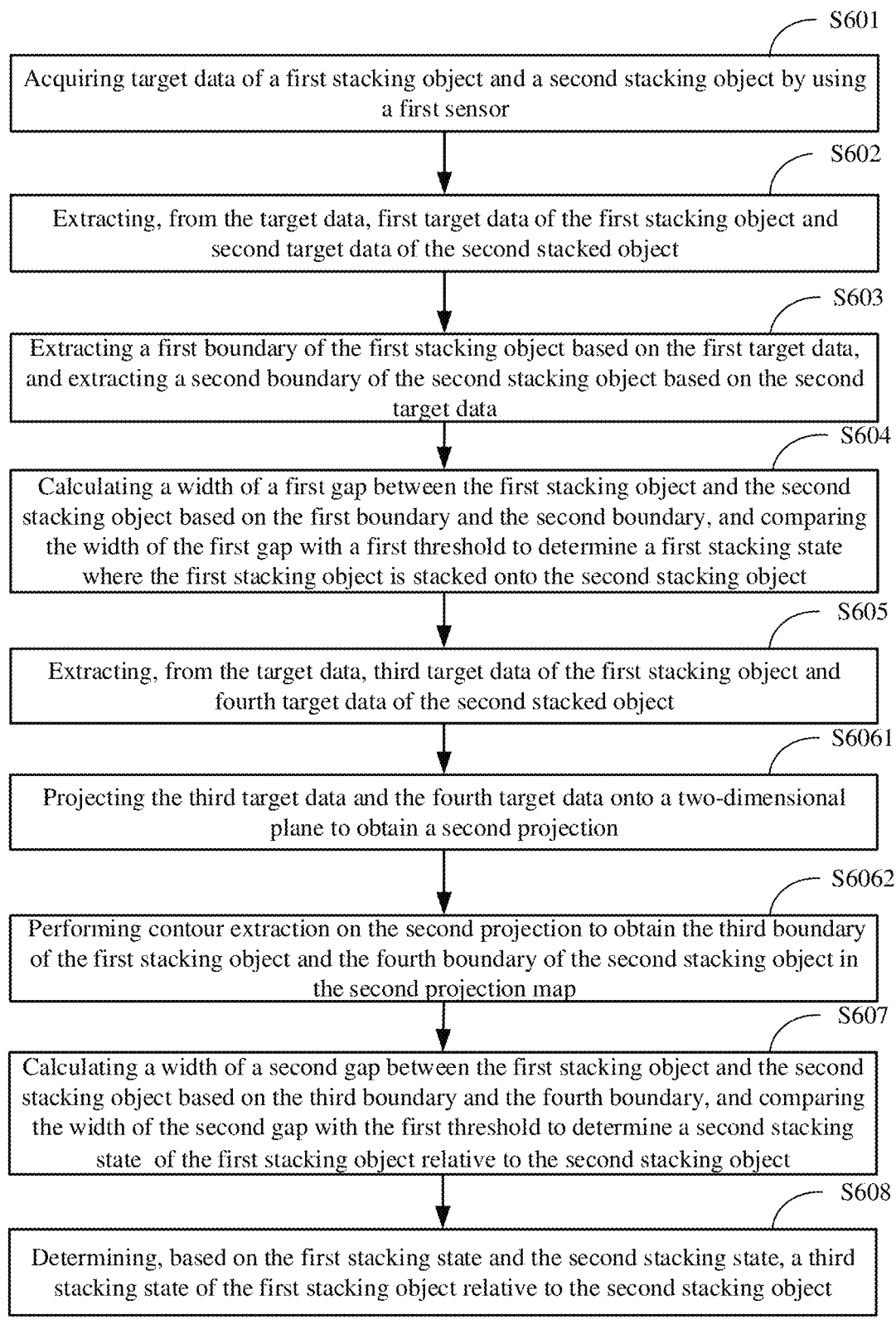
FIG. 15 is a flowchart of yet still another method for determining a stacking state according to an embodiment of the present disclosure.

In an implementation, as shown in FIG. 15, in the embodiment of the present disclosure, step S606 may include the following steps.

Step S6061: projecting the third target data and the fourth target data onto a two-dimensional plane to obtain a second projection.

Step S6062: performing contour extraction on the second projection to obtain the third boundary of the first stacking object and the fourth boundary of the second stacking object in the second projection.

The two-dimensional plane herein may include but is not limited to a plane for projecting and analyzing the target data in a coordinate system of the material handling equipment.

The "determining, based on the first stacking state and the second stacking state, a third stacking state of the first stacking object relative to the second stacking object" in Step S608 is described below in detail with reference to the embodiment.

Specifically, when the first stacking state is the first safe state, and the second stacking state is a second safe state, the third stacking state is determined to be sensing-based stacking success; when the first stacking state is a first unsafe state and/or the second stacking state is a second unsafe state, the third stacking state is determined to be sensing-based stacking failure.

Figure 9:
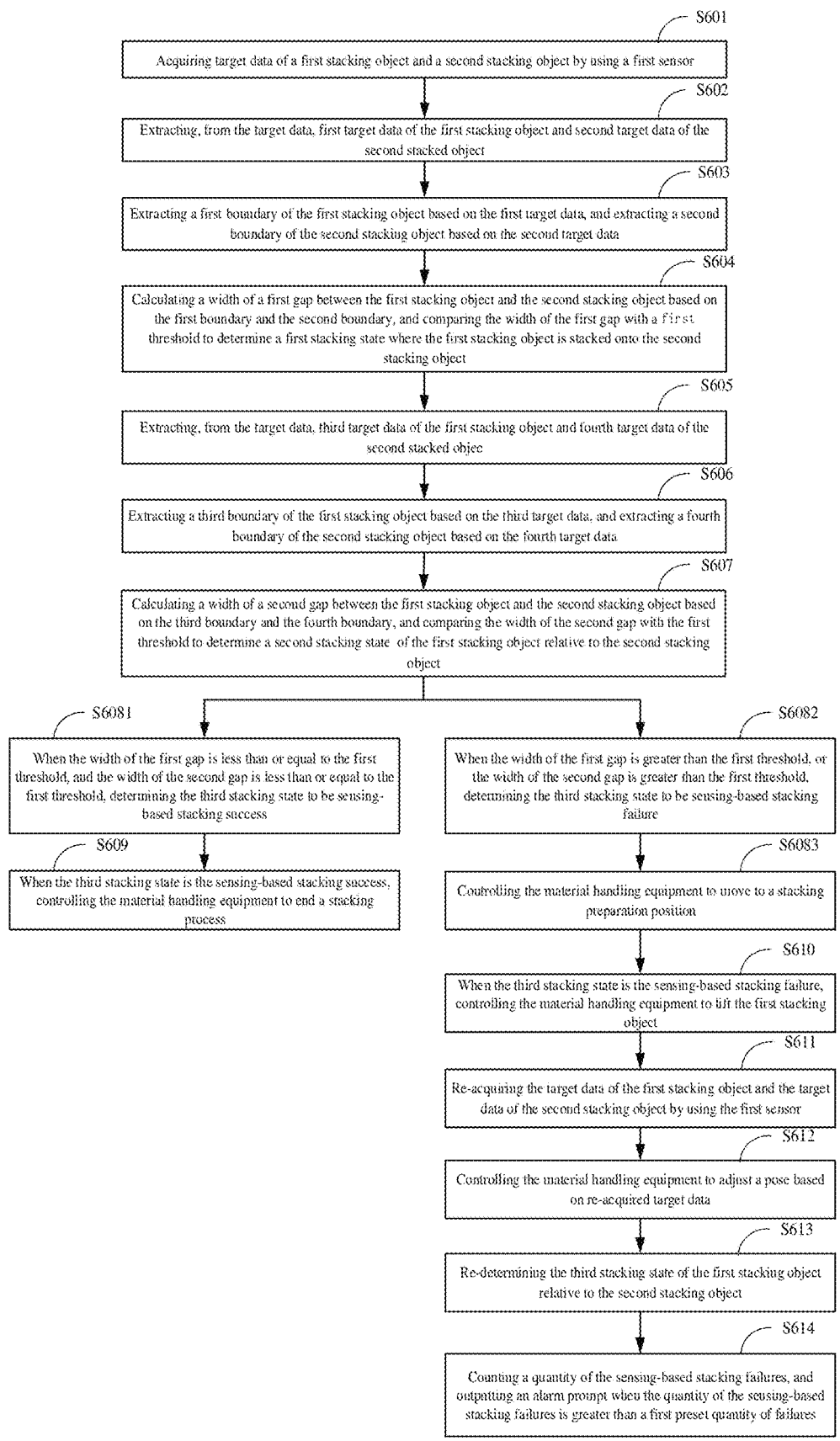
FIG. 9 is a flowchart of yet still another method for determining a stacking state according to an embodiment of the present disclosure.

In other words, as shown in FIG. 9, Step S608 may include the following steps.

Step S6081: when the width of the first gap is less than or equal to the first threshold, and the width of the second gap is less than or equal to the first threshold, determining the third stacking state to be sensing-based stacking success.

Step S6082: when the width of the first gap is greater than the first threshold, or the width of the second gap is greater than the first threshold, determining the third stacking state to be sensing-based stacking failure.

In the embodiment of the present disclosure, a stacking state of the first stacking object relative to the second stacking object is determined jointly based on gap widths on opposite sides when the first stacking object is stacked onto the second stacking object, thereby improving efficiency and accuracy of a determining process of the stacking state.

Further, as shown in FIG. 9, the method for determining the stacking state according to the embodiment of the present disclosure may further include the following steps.

Step S609: when the third stacking state is the sensing-based stacking success, controlling the material handling equipment to end a stacking process. For example, when the material handling equipment is an automated guided forklift, the controller may control the automated guided forklift to perform a fork-out operation.

In addition, when the third stacking state is the sensing-based stacking failure, that is, the first stacking object fails to be stacked on the second stacking object, it may be considered that there is an obvious obstacle on the second stacking object. Thus, when the third stacking state is the sensing-based stacking failure, the material handling equipment may be controlled to lift the first stacking object. In this case, the obstacle may be removed, and the controller may re-determine the third stacking state.

A retry mechanism used when the third stacking state is the sensing-based stacking failure is further proposed in the embodiment of the present disclosure. As shown in FIG. 9, the retry mechanism may further include the following steps.

Step S610: when the third stacking state is the sensing-based stacking failure, controlling the material handling equipment to lift the first stacking object.

Step S611: re-acquiring the target data of the first stacking object and the target data of the second stacking object by using the first sensor.

Step S612: controlling the material handling equipment to adjust a pose based on re-acquired target data.

Step S613: re-determining the third stacking state of the first stacking object relative to the second stacking object.

In addition to the retry mechanism, the controller may further control the material handling equipment to move to a stacking preparation position, that is, a starting position returned after stacking determined as failed.

Exemplarily, as shown in FIG. 9, the method for determining the stacking state according to the embodiment of the present disclosure may further include the following steps.

Step S6083: controlling the material handling equipment to move to a stacking preparation position.

In addition, to improve reliability of a stacking operation and avoid a failure attempt of an infinite cycle due to an abnormal condition, an alarm mechanism is further proposed in the embodiment of the present. When the third stacking state is the sensing-based stacking failure, the method for determining the stacking state according to the embodiment of the present disclosure may further include the following steps.

Step S614: counting a quantity of the sensing-based stacking failures, and outputting an alarm prompt when the quantity of the sensing-based stacking failures is greater than a first preset quantity of failures. Once the quantity of the sensing-based stacking failures exceeds a first preset quantity of failures, an alarm prompt is output. This mechanism is designed to alert an operator or an automatic control system of a potential problem in a timely manner, so as to take an appropriate intervention measure to ensure continuity and safety of a stacking operation.

Figure 7:
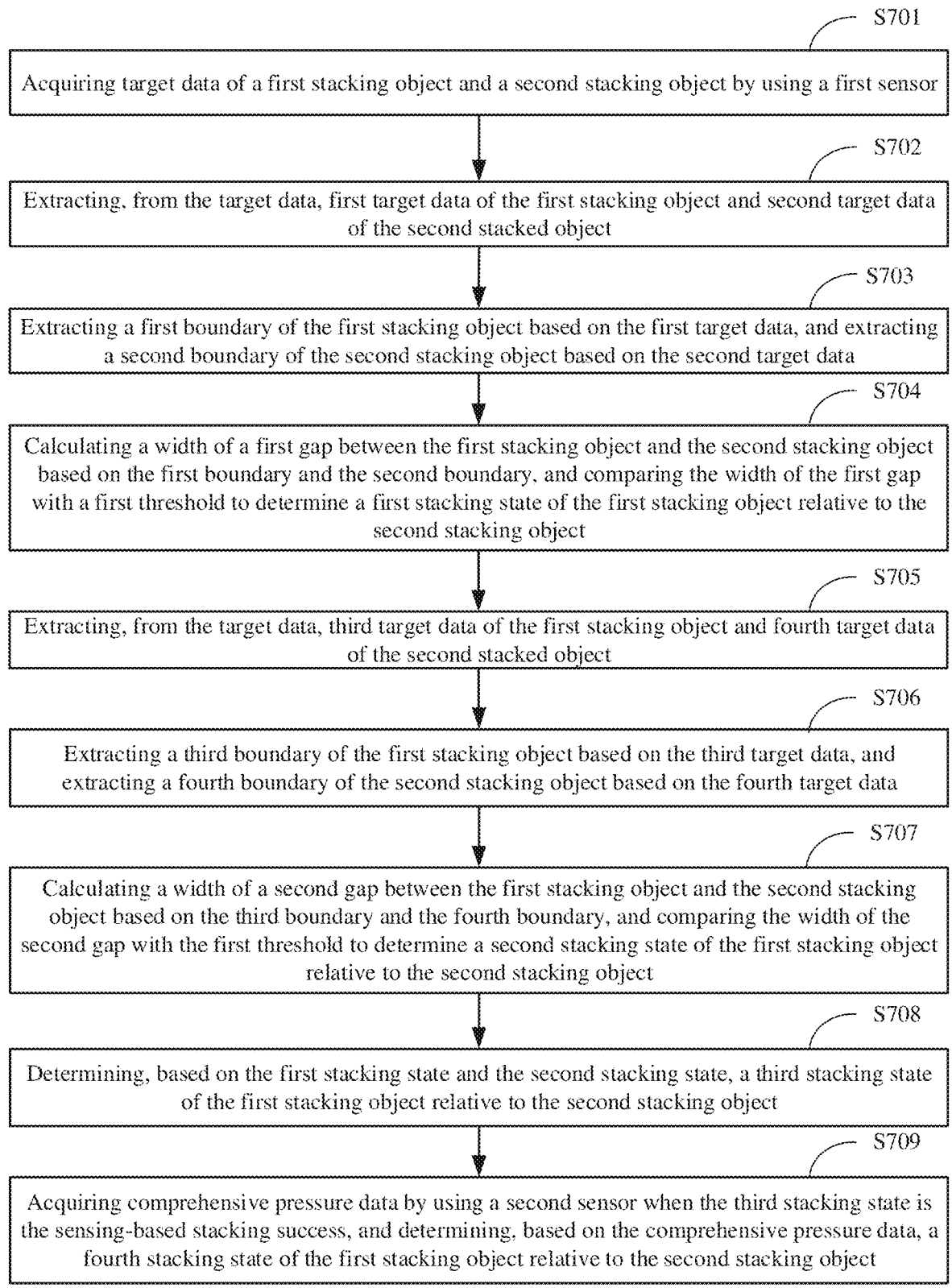
FIG. 7 is a flowchart of still another method for determining a stacking state according to an embodiment of the present disclosure.

Based on a same idea, an embodiment of the present disclosure further provides a method for determining a stacking state. As shown in FIG. 7, the method includes the following steps.

Step S701: acquiring target data of a first stacking object and a second stacking object by using a first sensor.

Step S702: extracting, from the target data, first target data of the first stacking object and second target data of the second stacking object.

Step S703: extracting a first boundary of the first stacking object based on the first target data, and extracting a second boundary of the second stacking object based on the second target data.

Step S704: calculating a width of a first gap between the first stacking object and the second stacking object based on the first boundary and the second boundary, and comparing the width of the first gap with a first threshold to determine a first stacking state of the first stacking object relative to the second stacking object.

Step S705: extracting, from the target data, third target data of the first stacking object and fourth target data of the second stacking object.

Step S706: extracting a third boundary of the first stacking object based on the third target data, and extracting a fourth boundary of the second stacking object based on the fourth target data.

Step S707: calculating a width of a second gap between the first stacking object and the second stacking object based on the third boundary and the fourth boundary, and comparing the width of the second gap with the first threshold to determine a second stacking state of the first stacking object relative to the second stacking object.

Step S708: determining, based on the first stacking state and the second stacking state, a third stacking state of the first stacking object relative to the second stacking object.

Step S709: acquiring comprehensive pressure data by using a second sensor when the third stacking state is the sensing-based stacking success, and determining, based on the comprehensive pressure data, a fourth stacking state of the first stacking object relative to the second stacking object.

Content of Step S701 to Step S708 is the same as that of Step S601 to Step S608, and details are not described herein again.

The "acquiring comprehensive pressure data by using a second sensor when the third stacking state is the sensing-based stacking success, and determining, based on the comprehensive pressure data, a fourth stacking state of the first stacking object relative to the second stacking object" in Step S709 is described below in detail with reference to the embodiment.

In the embodiment of the present disclosure, only when the third stacking state is the sensing-based stacking success, to further ensure accuracy of a determined stacking state, the comprehensive pressure data may be further acquired by using the second sensor, and thus the fourth stacking state is determined based on the comprehensive pressure data. When the third stacking state is the sensing-based stacking failure, there is no need to acquire the comprehensive pressure data by using the second sensor.

Figure 10:
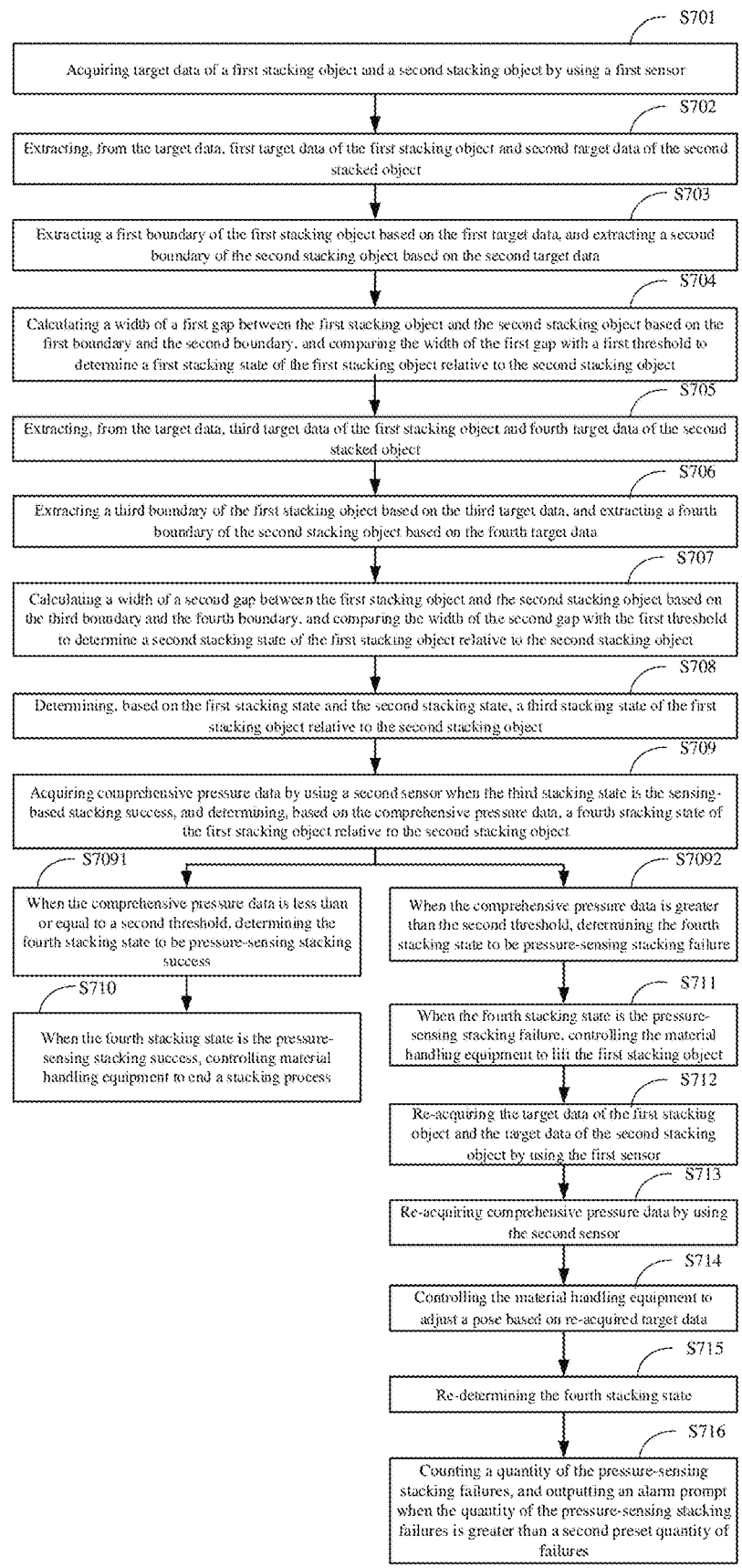
FIG. 10 is a flowchart of yet still another method for determining a stacking state according to an embodiment of the present disclosure.

Specifically, as shown in FIG. 10, Step S709 may include the following steps.

Step S7091: when the comprehensive pressure data is less than or equal to a second threshold, determining the fourth stacking state to be pressure-sensing stacking success.

Step S7092: when the comprehensive pressure data is greater than the second threshold, determining the fourth stacking state to be pressure-sensing stacking failure.

In the embodiment of the present disclosure, the third stacking state of the first stacking object relative to the second stacking object is determined based on gap widths on opposite sides when the first stacking object is stacked onto the second stacking object. When the third stacking state is the sensing-based stacking success, the fourth stacking state is further determined with reference to comprehensive pressure data. The fourth stacking state is pressure-sensing stacking success or pressure-sensing stacking failure. In other words, in this embodiment of the present disclosure, a stacking state of the first stacking object relative to the second stacking object may be jointly determined with reference to data collected by a plurality of sensors, so as to ensure accuracy of a stacking determining process.

Further, as shown in FIG. 10, the method for determining the stacking state according to the embodiment of the present disclosure may further include the following steps.

Step S710: when the fourth stacking state is the pressure-sensing stacking success, controlling material handling equipment to end a stacking process. When the material handling equipment is an automated guided forklift, the ending process of stacking operation may be a fork-out operation.

In addition, a retry mechanism used when the fourth stacking state is the pressure-sensing stacking failure is further proposed in the embodiment of the present disclosure, and the retry mechanism may further include the following steps.

Step S711: when the fourth stacking state is the pressure-sensing stacking failure, controlling the material handling equipment to lift the first stacking object.

Step S712: re-acquiring the target data of the first stacking object and the target data of the second stacking object by using the first sensor.

Step S713: re-acquiring comprehensive pressure data by using the second sensor.

Step S714: controlling the material handling equipment to adjust a pose based on re-acquired target data.

Step S715: re-determining the fourth stacking state.

In addition, to improve reliability of a stacking operation and avoid a failure attempt of an infinite cycle due to an abnormal condition, an alarm mechanism is further proposed in the embodiment of the present disclosure.

In an implementation, the method for determining the stacking state according to the embodiment of the present disclosure may further include the following steps.

Step S716: counting a quantity of the pressure-sensing stacking failures, and outputting an alarm prompt when the quantity of the pressure-sensing stacking failures is greater than a second preset quantity of failures. Once the quantity of the pressure-sensing stacking failures exceeds a second preset quantity of failures, the alarm prompt is output. This mechanism is designed to alert an operator or an automatic control system of a potential problem in a timely manner, so as to take an appropriate intervention measure to ensure continuity and safety of a stacking operation.

In another implementation, the method for determining the stacking state according to the embodiment of the present disclosure may further include the following steps.

Step S717: counting a quantity of the sensing-based stacking failures and a quantity of the pressure-sensing stacking failures, and outputting an alarm prompt when a sum of the quantity of the sensing-based stacking failures and the quantity of the pressure-sensing stacking failures is greater than a third preset quantity of failures.

The first preset quantity of failures, the second preset quantity of failures, and the third preset quantity of failures may have a same value or different values. The first preset quantity of failures, the second preset quantity of failures, and the third preset quantity of failures having a same value is used as an example. For example, the first preset quantity of failures, the second preset quantity of failures, and the third preset quantity of failures are all set to 5. That is, when the quantity of the sensing-based stacking failures exceeds 5, or the quantity of the pressure-sensing stacking failures exceeds 5, or a sum of the quantity of the sensing-based stacking failures and the quantity of the pressure-sensing stacking failures exceeds 5, an alarm prompt is output. A specific quantity of failures in the embodiment of the present disclosure is not limited, which may be adjusted according to an actual situation.

Figure 8:
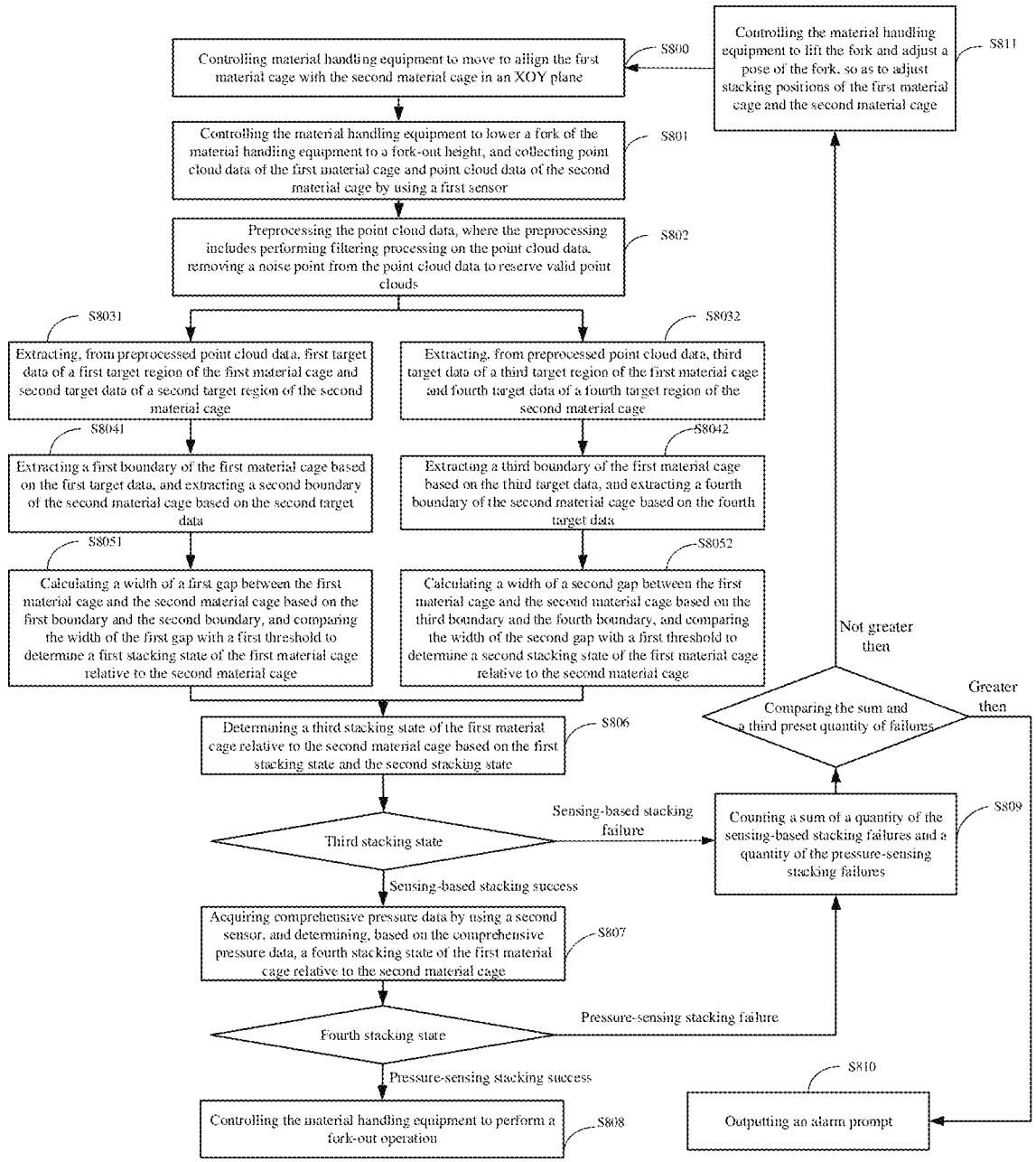
FIG. 8 is a flowchart of yet still another method for determining a stacking state according to an embodiment of the present disclosure.

The following describes, with reference to an actual application scenario, an implementation of the method for determining a stacking state provided in the embodiment of the present disclosure. As shown in FIG. 8, for example, the first stacking object is a first material cage and the second stacking object is a second material cage. The method includes the following steps.

Step S800: controlling material handling equipment to move to align the first material cage with the second material cage in an XOY plane.

Step S801: controlling the material handling equipment to lower a fork of the material handling equipment to a fork-out height, and collecting point cloud data of the first material cage and point cloud data of the second material cage by using a first sensor.

Step S802: preprocessing the point cloud data, where the preprocessing includes performing filtering processing on the point cloud data, removing a noise point from the point cloud data to reserve valid point clouds.

Step S8031: extracting, from preprocessed point cloud data, first target data of a first target region of the first material cage and second target data of a second target region of the second material cage.

Step S8032: extracting, from preprocessed point cloud data, third target data of a third target region of the first material cage and fourth target data of a fourth target region of the second material cage.

Step S8041: extracting a first boundary of the first material cage based on the first target data, and extracting a second boundary of the second material cage based on the second target data.

Step S8042: extracting a third boundary of the first material cage based on the third target data, and extracting a fourth boundary of the second material cage based on the fourth target data.

Step S8051: calculating a width of a first gap between the first material cage and the second material cage based on the first boundary and the second boundary, and comparing the width of the first gap with a first threshold to determine a first stacking state of the first material cage relative to the second material cage.

Step S8052: calculating a width of a second gap between the first material cage and the second material cage based on the third boundary and the fourth boundary, and comparing the width of the second gap with a first threshold to determine a second stacking state of the first material cage relative to the second material cage.

Step S806: determining a third stacking state of the first material cage relative to the second material cage based on the first stacking state and the second stacking state. When the third stacking state is sensing-based stacking success, Step S807 is performed; otherwise, Step S809 is performed.

Step S807: acquiring comprehensive pressure data by using a second sensor, and determining, based on the comprehensive pressure data, a fourth stacking state of the first material cage relative to the second material cage. When the fourth stacking state is pressure-sensing stacking success, Step S808 is further performed; when the fourth stacking state is pressure-sensing stacking failure, Step S809 is performed.

Step S808: controlling the material handling equipment to perform a fork-out operation. A process ends.

Step S809: counting a sum of a quantity of the sensing-based stacking failures and a quantity of the pressure-sensing stacking failures, performing Step S810 when the sum is greater than a third preset quantity of failures and performing Step S811 when the sum is not greater than a third preset quantity of failures.

Step S810: outputting an alarm prompt. A process ends.

Step S811: controlling the material handling equipment to lift the fork and adjust a pose of the fork, so as to adjust stacking positions of the first material cage and the second material cage, and then returning to Step S800.

The foregoing describes specific embodiments of this specification. Other embodiments fall within the scope of the appended claims. In some cases, actions or steps recorded in the claims may be performed in an order other than those described in the embodiments, while still bringing desired results. In addition, the desired results do not require a process illustrated in the drawings to necessarily follow the shown specific order or sequential order. In some implementations, multitasking and parallel processing are also possible or may be advantageous.

According to an embodiment of another aspect, a controller is provided. The controller is configured to executes program instructions to implement any method for determining a stacking state disclosed in embodiments of the present disclosure.

According to an embodiment of another aspect, material handling equipment is further provided. The material handling equipment includes a controller, configured to executes program instructions to implement any method for determining a stacking state disclosed in embodiments of the present disclosure.

Embodiments in this specification are all described in a progressive manner, for same or similar parts in embodiments, mutual reference may be made. Each embodiment focuses on what is different from other embodiments. Especially, The controller embodiment or the material handling equipment embodiment is basically similar to a method embodiment, and therefore is described briefly; and for related parts, reference may be made to partial descriptions in the method embodiment. The controller embodiments or the material handling equipment embodiment described above are merely an example. The units described as separate parts may be or may not be physically separate, and parts displayed as units may be or may not be physical units, that is, may be located at one position, or may be distributed on a plurality of network units. Some or all of the modules may be selected according to an actual need to achieve the objectives of the solutions of the embodiments. A person of ordinary skill in the art may understand and implement embodiments of the present disclosure without creative efforts.

In addition, an embodiment of the present disclosure further provides a computer-readable storage medium, where the computer-readable storage medium stores a computer program. When the program is executed by a processor, the method in any one of the foregoing method embodiments is implemented.

The present disclosure further provides a computer program product, including a computer program. When the computer program is executed by a processor, the method in any one of the foregoing method embodiments is implemented.

According to specific embodiments provided in the present application, the present application discloses the following technical effects.

Firstly, in the present application, a stacking state of the first stacking object relative to the second stacking object is determined based on a width of a gap between the first stacking object and the second stacking object. Because a large quantity of labeled data is not required, dependence on data is reduced, thereby improving efficiency and accuracy of a determining process of a stacking state.

Secondly, in the present application, a stacking state of the first stacking object relative to the second stacking object is determined based on a width of a gap formed on any side when the first stacking object is stacked onto the second stacking object, thereby improving efficiency and accuracy of a determining process of a stacking state.

Thirdly, in the present application, a stacking state of the first stacking object relative to the second stacking object is determined jointly based on gap widths on opposite sides when the first stacking object is stacked onto the second stacking object, thereby improving efficiency and accuracy of a determining process of a stacking state.

Fourthly, in the present application, comprehensive pressure data is further introduced. When sensing-based stacking success is determined, a stacking state of the first stacking object relative to the second stacking object is further determined based on the comprehensive pressure data, thereby improving accuracy of stacking state evaluation.

Fifthly, in the present application, an effective boundary extraction method is provided by projecting target data into a two-dimensional plane and extracting a contour, thereby improving accuracy of stacking state evaluation.

Sixthly, in the present application, when it is determined that stacking of the first stacking object and the second stacking object are successful, a fork-out operation is performed; when it is determined that stacking of the first stacking object and the second stacking object stacking are failed, a stacking position of the first stacking object and the second stacking object is re-adjusted, thereby implementing intelligent control on material handling equipment, optimizing a stacking procedure, reducing manual intervention, improving operation efficiency, and also reducing a safety risk caused by an improper operation.

Seventhly, in the present application, a fork is controlled to lower to a fork-out height, and then a sensor is controlled to perform scanning. Such operation may ensure that the sensor collects data at a best position, improving data quality and ensuring data accuracy.

Eighthly, in the present application, data accuracy and reliability are improved by preprocessing target data, which provides high-quality data for subsequent stacking state evaluation.

Lastly, in the present application, a safety mechanism is provided by counting a quantity of stacking failures and outputting an alarm prompt, thereby ensuring safety and continuity of a stacking operation.

Certainly, any invention of the present application is not necessarily required to achieve all of the advantages described above.

Based on the foregoing descriptions of the implementations, a person skilled in the art may clearly understand that the present disclosure may be implemented by software in addition to a necessary universal hardware platform. Based on such an understanding, the technical solutions in the present disclosure essentially, or the part contributing to the conventional technology may be implemented in a form of a computer program product. The computer program product may be stored in a storage medium, for example, a ROM/RAM, a magnetic disk, or an optical disc, and includes several instructions for instructing a computer device (which may be a personal computer, a server, a network device, or the like) to perform the methods in all embodiments or some of the embodiments of the present disclosure.

The technical solutions provided in the present disclosure are described above in detail. The principles and implementations of the present disclosure are described herein by using specific examples. The descriptions about embodiments of the present disclosure are merely provided to help understand the methods and core ideas of the present disclosure. In addition, a person of ordinary skill in the art can make variations to the present disclosure in terms of the specific implementations and disclosure scopes according to the ideas of the present disclosure. Therefore, the content of this specification shall not be construed as a limitation on the present disclosure.

What is claimed is:

1. A material handling equipment, comprising a controller, wherein the controller is configured to execute program instructions to implement following steps:
   acquiring target data of a first stacking object and a second stacking object by using a first sensor;
   extracting, from the target data, first target data of the first stacking object and second target data of the second stacking object;
   extracting a first boundary of the first stacking object based on the first target data, and extracting a second boundary of the second stacking object based on the second target data; and
   calculating a width of a first gap between the first stacking object and the second stacking object based on the first boundary and the second boundary, and comparing the width of the first gap with a first threshold to determine a first stacking state of the first stacking object relative to the second stacking object;
   wherein the extracting the first boundary of the first stacking object based on the first target data, and extracting the second boundary of the second stacking object based on the second target data comprises:
   projecting the first target data and the second target data onto a two-dimensional plane to obtain a first projection; and
   performing contour extraction on the first projection to obtain the first boundary of the first stacking object and the second boundary of the second stacking object in the first projection.

2. The material handling equipment according to claim 1, wherein the controller is further configured to implement following steps:
   extracting, from the target data, third target data of the first stacking object and fourth target data of the second stacking object;
   extracting a third boundary of the first stacking object based on the third target data, and extracting a fourth boundary of the second stacking object based on the fourth target data;
   calculating a width of a second gap between the first stacking object and the second stacking object based on the third boundary and the fourth boundary, and comparing the width of the second gap with the first threshold to determine a second stacking state of the first stacking object relative to the second stacking object; and determining, based on the first stacking state and the second stacking state, a third stacking state of the first stacking object relative to the second stacking object.

3. The material handling equipment according to claim 2, wherein before the acquiring target data of a first stacking object and a second stacking object by using a first sensor, the controller is further configured to implement following steps:
controlling the material handling equipment to move to align the first stacking object with the second stacking object in an XOY plane.

4. The material handling equipment according to claim 3, wherein the determining, based on the first stacking state and the second stacking state, the third stacking state of the first stacking object relative to the second stacking object comprises:
when the width of the first gap is less than or equal to the first threshold, and the width of the second gap is less than or equal to the first threshold, determining the third stacking state to be sensing-based stacking success; and
when the width of the first gap is greater than the first threshold, or the width of the second gap is greater than the first threshold, determining the third stacking state to be sensing-based stacking failure.

5. The material handling equipment according to claim 4, wherein the controller is further configured to implement following steps:
when the third stacking state is the sensing-based stacking success, controlling the material handling equipment to end a stacking process.

6. The material handling equipment according to claim 4, wherein the controller is further configured to implement following steps:
when the third stacking state is the sensing-based stacking failure, controlling the material handling equipment to lift the first stacking object;
re-acquiring the target data of the first stacking object and the second stacking object by using the first sensor;
controlling the material handling equipment to adjust a pose; and
re-determining the third stacking state.

7. The material handling equipment according to claim 6, wherein the controlling the handling equipment to lift the first stacking object comprises:
controlling the handling equipment to lift the first stacking object to a stacking preparation height.

8. The material handling equipment according to claim 6, wherein the controller is further configured to implement following steps:
when the third stacking state is the sensing-based stacking failure, controlling the material handling equipment to move to a stacking preparation position.

9. The material handling equipment according to claim 6, wherein the controller is further configured to implement following steps:
counting a quantity of the sensing-based stacking failures, and outputting an alarm prompt when the quantity of the sensing-based stacking failures is greater than a first preset quantity of failures.

10. The material handling equipment according to claim 4, wherein the controller is further configured to implement following steps:
when the third stacking state is the sensing-based stacking failure, controlling the handling equipment to lift the first stacking object; and
re-determining the third stacking state.

11. The material handling equipment according to claim 4, wherein the controller is further configured to implement following steps:
acquiring comprehensive pressure data by using a second sensor when the third stacking state is the sensing-based stacking success, and determining, based on the comprehensive pressure data, a fourth stacking state of the first stacking object relative to the second stacking object.

12. The material handling equipment according to claim 11, wherein the determining, based on the comprehensive pressure data, the fourth stacking state of the first stacking object relative to the second stacking object comprises:
when the comprehensive pressure data is less than or equal to a second threshold, determining the fourth stacking state to be pressure-sensing stacking success;
when the comprehensive pressure data is greater than the second threshold, determining the fourth stacking state to be pressure-sensing stacking failure.

13. The material handling equipment according to claim 12, wherein the controller is further configured to implement following steps:
when the fourth stacking state is the pressure-sensing stacking success, controlling the material handling equipment to end a stacking process.

14. The material handling equipment according to claim 12, wherein the controller is further configured to implement following steps:
when the fourth stacking state is the pressure-sensing stacking failure, controlling the material handling equipment to lift the first stacking object;
re-acquiring the target data of the first stacking object and the second stacking object by using the first sensor;
re-acquiring, by the second sensor, the comprehensive pressure data;
controlling the material handling equipment to adjust a pose; and
re-determining the fourth stacking state.

15. The material handling equipment according to claim 14, wherein the controller is further configured to implement following steps:
counting a quantity of the pressure-sensing stacking failures, and outputting an alarm prompt when the quantity of the pressure-sensing stacking failures is greater than a second preset quantity of failures.

16. The material handling equipment according to claim 14, wherein the controller is further configured to implement following steps:
counting a quantity of sensing-based stacking failures and a quantity of the pressure-sensing stacking failures; and
outputting an alarm prompt when a sum of the quantity sensing-based stacking failures and the quantity of the pressure-sensing stacking failures is greater than a third preset quantity of failures.

17. The material handling equipment according to claim 2, wherein the first target data is data of a first target region of the first stacking object, and the second target data is data of a second target region of the second stacking object; and the first target region and the second target region are respectively located on a same side of the first stacking object and the second stacking object; and
the third target data is data of a third target region of the first stacking object, and the fourth target data is data of a fourth target region of the second stacking object; and the third target region and the fourth target region are respectively located on another same side of the first stacking object and the second stacking object.

18. The material handling equipment according to claim 17, wherein the first target region and the third target region are respectively located on opposite sides of the first stacking object, and the second target region and the fourth target region are respectively located on opposite sides of the second stacking object.

19. The material handling equipment according to claim 18, wherein the first target region comprises a bottom edge on a side of the first stacking object, the second target region comprises a top edge on a side of the second stacking object, the third target region comprises a bottom edge on the other side of the first stacking object, and the fourth target region at least comprises a top edge on the other side of the second stacking object.

20. The material handling equipment according to claim 2, wherein the extracting the third boundary of the first stacking object based on the third target data, and extracting the fourth boundary of the second stacking object based on the fourth target data comprises:
  projecting the third target data and the fourth target data onto a two-dimensional plane to obtain a second projection; and
  performing contour extraction on the second projection to obtain the third boundary of the first stacking object and the fourth boundary of the second stacking object in the second projection.

21. The material handling equipment according to claim 2, wherein the calculating the width of the second gap between the first stacking object and the second stacking object based on the third boundary and the fourth boundary comprises:
  determining a second width between the third boundary and the fourth boundary based on the third boundary and the fourth boundary, wherein the second width is a largest width between the third boundary and the fourth boundary; and
  determining the second width to be the width of the second gap.

22. The material handling equipment according to claim 1, wherein the calculating the width of the first gap between the first stacking object and the second stacking object based on the first boundary and the second boundary comprises:
  determining a first width between the first boundary and the second boundary based on the first boundary and the second boundary, wherein the first width is a largest width between the first boundary and the second boundary; and
  determining the first width to be the width of the first gap.

23. A controller, configured to execute program instructions, to implement following steps:
  acquiring target data of a first stacking object and a second stacking object by using a first sensor;
  extracting, from the target data, first target data of the first stacking object and second target data of the second stacking object;
  extracting a first boundary of the first stacking object based on the first target data, and extracting a second boundary of the second stacking object based on the second target data; and
  calculating a width of a first gap between the first stacking object and the second stacking object based on the first boundary and the second boundary, and comparing the width of the first gap with a first threshold to determine a first stacking state of the first stacking object relative to the second stacking object;
  wherein the extracting the first boundary of the first stacking object based on the first target data, and extracting the second boundary of the second stacking object based on the second target data comprises:
  projecting the first target data and the second target data onto a two-dimensional plane to obtain a first projection; and
  performing contour extraction on the first projection to obtain the first boundary of the first stacking object and the second boundary of the second stacking object in the first projection.

24. A method for determining a stacking state, comprising:
  acquiring target data of a first stacking object and a second stacking object by using a first sensor;
  extracting, from the target data, first target data of the first stacking object and second target data of the second stacking object;
  extracting a first boundary of the first stacking object based on the first target data, and extracting a second boundary of the second stacking object based on the second target data; and
  calculating a width of a first gap between the first stacking object and the second stacking object based on the first boundary and the second boundary, and comparing the width of the first gap with a first threshold to determine a first stacking state of the first stacking object relative to the second stacking object;
  wherein the extracting the first boundary of the first stacking object based on the first target data, and extracting the second boundary of the second stacking object based on the second target data comprises:
  projecting the first target data and the second target data onto a two-dimensional plane to obtain a first projection; and
  performing contour extraction on the first projection to obtain the first boundary of the first stacking object and the second boundary of the second stacking object in the first projection.

* * * * *